US012224508B2

(12) United States Patent
Yang et al.

(10) Patent No.: US 12,224,508 B2
(45) Date of Patent: Feb. 11, 2025

(54) ZERO-CLEARANCE FIFTH-GENERATION (5G) ULTRA-WIDEBAND (UWB) MULTIPLE-INPUT MULTIPLE-OUTPUT (MIMO) ANTENNA

(71) Applicant: Anhui University, Hefei (CN)

(72) Inventors: Lixia Yang, Hefei (CN); Zhanhao Zhang, Hefei (CN); Aidi Ren, Hefei (CN); Haoran Yu, Hefei (CN)

(73) Assignee: Anhui University, Hefei (CN)

(*) Notice: Subject to any disclaimer, the term of this patent is extended or adjusted under 35 U.S.C. 154(b) by 141 days.

(21) Appl. No.: 17/970,559

(22) Filed: Oct. 20, 2022

(65) Prior Publication Data

US 2023/0130277 A1  Apr. 27, 2023

(30) Foreign Application Priority Data

Oct. 21, 2021 (CN) .......................... 202111229025.5

(51) Int. Cl.
*H01Q 9/06* (2006.01)
*H01Q 13/10* (2006.01)
*H01Q 21/00* (2006.01)
*H04B 7/0413* (2017.01)

(52) U.S. Cl.
CPC .......... *H01Q 9/065* (2013.01); *H01Q 13/106* (2013.01); *H01Q 21/0006* (2013.01); *H04B 7/0413* (2013.01)

(58) Field of Classification Search
CPC .. H01Q 9/065; H01Q 13/106; H01Q 21/0006; H04B 7/0413
See application file for complete search history.

(56) References Cited

FOREIGN PATENT DOCUMENTS

| CN | 106033842 A | * | 10/2016 | |
|---|---|---|---|---|
| CN | 108565544 A | * | 9/2018 | ............... H01Q 1/36 |
| CN | 109841943 A | * | 6/2019 | |
| CN | 213660626 U | * | 7/2021 | |
| CN | 113410661 B | * | 12/2021 | |

OTHER PUBLICATIONS

CNIPA; First Office Action for CN Application No. 202111229025.5; issued May 19, 2022; 5 pages.

* cited by examiner

*Primary Examiner* — Jimmy T Vu
(74) *Attorney, Agent, or Firm* — NOD Law PC (57) ABSTRACT

Provided is a zero-clearance fifth-generation (5G) ultra-wideband (UWB) Multiple-Input Multiple-Output (MIMO) antenna, including a main dielectric substrate, lateral dielectric substrates, and multiple antenna elements, where the lateral dielectric substrates are arranged at two sides of the main dielectric substrate; the multiple antenna elements are arranged on the lateral dielectric substrates; the antenna elements each include a feeding element and a grounding radiator element; the feeding element is provided at an inner side of each of the lateral dielectric substrates; and the grounding radiator element is provided at an outer side of the lateral dielectric substrate. Under a combined action of the feeding element and the grounding radiator element, the present disclosure forms a dual-resonant antenna structure to effectively cover N77, N78, N79 and 5G wireless local area network bands in 5G mobile communication, and achieves the desirable antenna efficiency as well as desirable isolation and ECC between the antenna elements.

6 Claims, 7 Drawing Sheets

ZERO-CLEARANCE FIFTH-GENERATION (5G) ULTRA-WIDEBAND (UWB) MULTIPLE-INPUT MULTIPLE-OUTPUT (MIMO) ANTENNA

CROSS REFERENCE TO RELATED APPLICATION

This patent application claims the benefit and priority of Chinese Patent Application No. 202111229025.5, filed with the China National Intellectual Property Administration on Oct. 21, 2021, the disclosure of which is incorporated by reference herein in its entirety as part of the present application.

TECHNICAL FIELD

The present disclosure relates to the technical field of wireless communication, and in particular to a zero-clearance fifth-generation (5G) ultra-wideband (UWB) multiple-input multiple-output (MIMO) antenna.

BACKGROUND

In recent years, with the rapid development of wireless communication technologies and the increasing demand for high transmission rate, 5G mobile communication is gradually coming into realization. Owing to the ability of obtaining a higher channel capacity, MIMO antenna arrays are deemed to have a broad prospect for 5G mobile terminal applications. In addition, multi-element MIMO antenna structures can effectively solve the multi-path fading problem and improve data throughput.

At present, 5G spectra have been established basically throughout the world. On the World Radiocommunication Conference 2015 (WRC-15), 5G spectra are determined and deployed in many regions. According to the announcement of the Ministry of Industry and Information Technology (MIIT) in China, 3.3-3.4 GHz, 3.4-3.6 GHz and 4.8-5.0 GHz will be planned as working bands of 5G systems. The European Union (EU) gives priorities to the 3.4-3.8 GHz band. Corresponding 5G bands are also being planned and developed in other countries and regions. In Japan, 4.4-4.9 GHz is planned as a low-frequency 5G band. Hence, how to design a MIMO antenna structure to cover the above bands is a main challenge to 5G antenna systems. In addition, while handheld devices are gradually becoming thinner with a narrower bezel (bezel-free), the design of a multi-element MIMO antenna structure having desirable antenna efficiency and inter-element isolation is more complicated.

SUMMARY

An objective of the present disclosure is to provide a zero-clearance 5G UWB MIMO antenna. While ensuring bezel-less mobile terminal devices, the present disclosure can effectively cover N77, N78, N79 and 5G wireless local area network (WLAN) bands in 5G mobile communication and realize various performances parameters of the antenna.

To achieve the above objective, the present disclosure provides the following technical solutions:

A zero-clearance 5G UWB MIMO antenna includes a main dielectric substrate, lateral dielectric substrates, and multiple antenna elements, where the lateral dielectric substrates are arranged on two sides of the main dielectric substrate; the multiple antenna elements are arranged on the lateral dielectric substrates; the antenna elements each include a feeding element and a grounding radiator element; the feeding element is provided at an inner side of each of the lateral dielectric substrates; and the grounding radiator element is provided at an outer side of the lateral dielectric substrate.

Optionally, spacings between the multiple antenna elements are different.

Optionally, the feeding element is inverted U-shaped, while the grounding radiator element is hollowed-out L-shaped.

Optionally, the feeding element is connected to a feeding line on the main dielectric substrate, and includes a first vertical branch, a second vertical branch, and a horizontal branch; the first vertical branch includes a top end connected to one end of the horizontal branch, and a bottom end connected to the feeding line; and the second vertical branch includes a top end connected to the other end of the horizontal branch, and a bottom end spaced apart from the main dielectric substrate.

Optionally, the grounding radiator element includes a first vertical radiator, a second vertical radiator, a third vertical radiator, a first horizontal radiator, and a second horizontal radiator; the first vertical radiator includes a top end connected to one end of the first horizontal radiator, and a bottom end connected to one end of the second horizontal radiator; a top end of the second vertical radiator is connected to the other end of the first horizontal radiator; a top end of the third vertical radiator is connected to the other end of the second horizontal radiator; and a bottom end of the second vertical radiator and a bottom end of the third vertical radiator are connected to a grounding point on the main dielectric substrate.

Optionally, there is a positive even number of antenna elements, and the antenna elements are symmetrically arranged on the lateral dielectric substrates.

Optionally, the main dielectric substrate and the lateral dielectric substrates are all made of an FR4 material.

According to the specific embodiments provided by the present disclosure, the present disclosure discloses the following technical effects:

Coupled feeding is employed in the antenna element, and the feeding element and the grounding radiator element do not overlap with each other. Therefore, the zero-clearance 5G UWB MIMO antenna effectively expands a bandwidth of the antenna element by virtue of a grounding current. Under a combined action of the feeding element and the grounding radiator element, the present disclosure forms a dual-resonant antenna structure to effectively cover N77, N78, N79 and 5G WLAN bands in 5G mobile communication, and achieves desirable antenna efficiency as well as desirable isolation and envelope correlation coefficient (ECC) between the antenna elements. The present disclosure features a simple structure, zero clearance and small height, and can meet design requirements of existing bezel-less mobile terminals.

BRIEF DESCRIPTION OF THE DRAWINGS

To describe the embodiments in the present disclosure or the technical solutions in the related art more clearly, the accompanying drawings required in the embodiments are briefly introduced below. Obviously, the accompanying drawings described below are only some embodiments of the present disclosure. Those of ordinary skill in the art may envision other accompanying drawings based on these accompanying drawings without undue experimentation.

DETAILED DESCRIPTION OF THE EMBODIMENTS

The technical solutions in the embodiments of the present disclosure are clearly and completely described below with reference to the accompanying drawings. The described embodiments are merely a part rather than all of the embodiments of the present disclosure. All other embodiments obtained by those of ordinary skill in the art based on the embodiments of the present disclosure without undue experimentation shall fall within the scope of the present disclosure.

An objective of the present disclosure is to provide a zero-clearance 5G UWB MIMO antenna. While ensuring bezel-less mobile terminal devices, the present disclosure can effectively cover N77, N78, N79 and 5G WLAN bands in 5G mobile communication and realize various performances of the antenna.

To make the above-mentioned objective, features, and advantages of the present disclosure clearer and more comprehensible, the present disclosure will be further described in detail below in conjunction with the accompanying drawings and specific embodiments.

Figure 1:
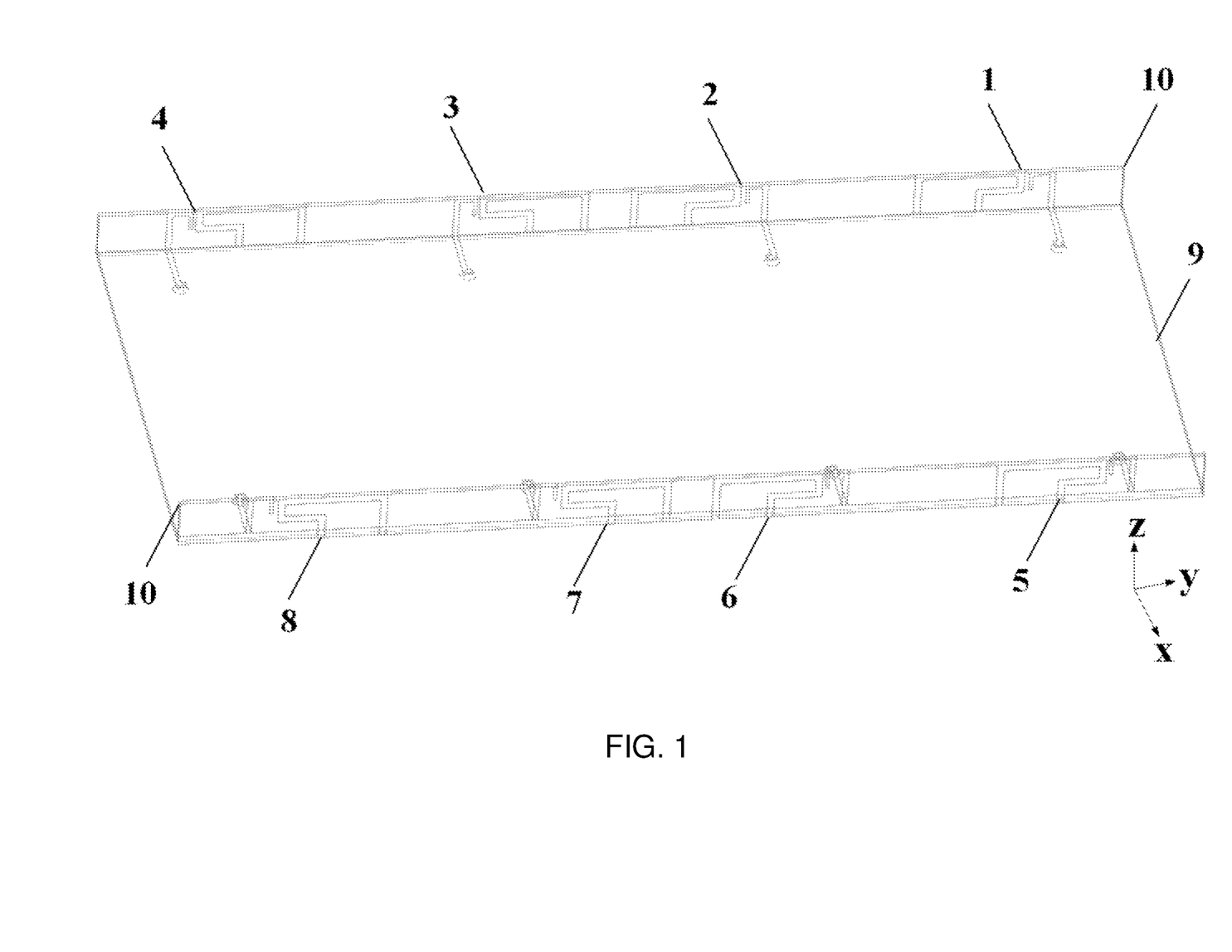
FIG. 1 is an overall structural view of a zero-clearance 5G UWB MIMO antenna according to an embodiment of the present disclosure.
Figure 2:
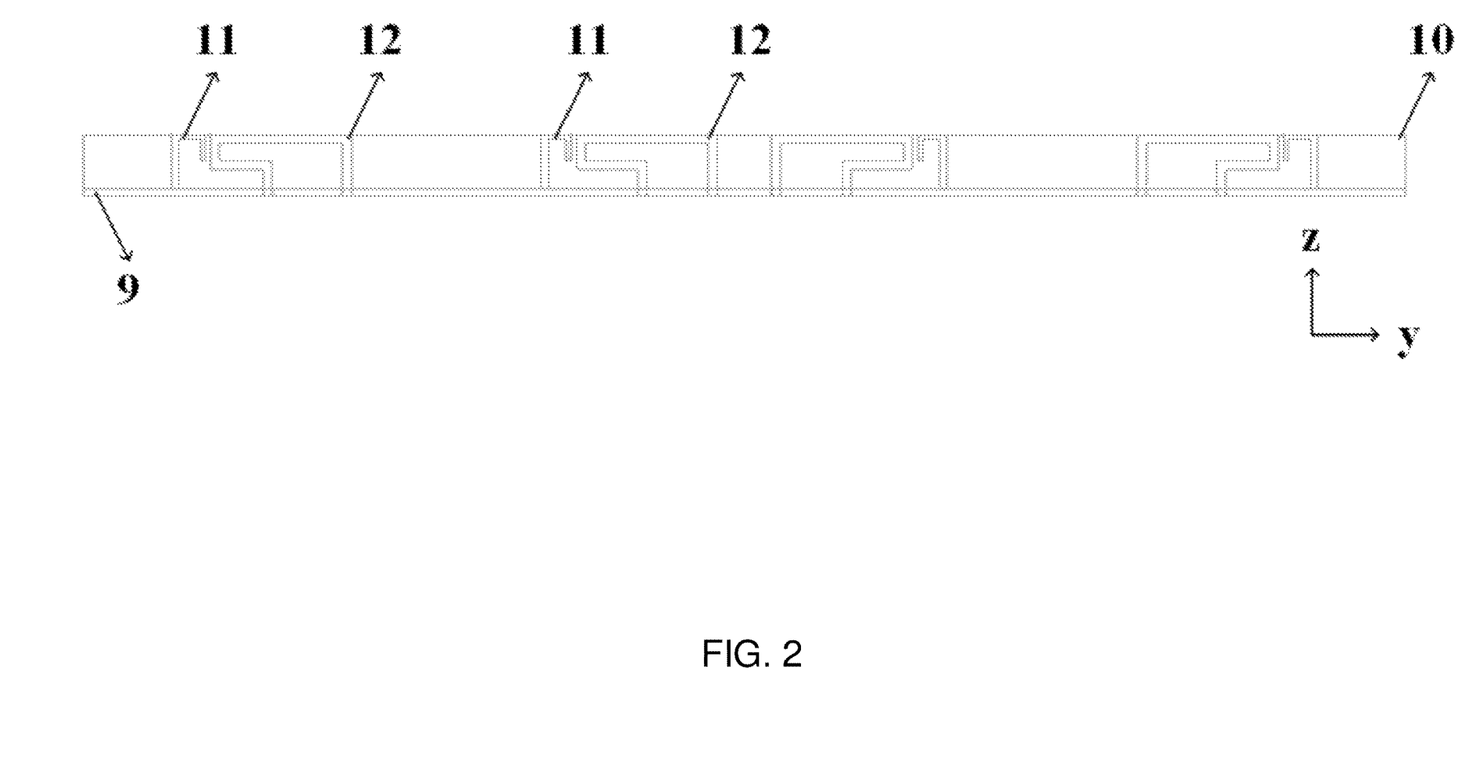
FIG. 2 is a front view of a zero-clearance 5G UWB MIMO antenna according to an embodiment of the present disclosure.

As shown in FIGS. 1-2, the zero-clearance 5G UWB MIMO antenna provided by the present disclosure includes a main dielectric substrate 9 provided horizontally, two lateral dielectric substrates 10 perpendicular to the main dielectric substrate 9, and antenna elements 1-8 at different spacings.

The two lateral dielectric substrates 10 are located at two long sides of the main dielectric substrate 9. The antenna elements are mainly arranged on the two lateral dielectric substrates 10. The antenna elements each are composed of an inverted U-shaped feeding element 11 and a hollowed-out L-shaped grounding radiator element 12. The feeding element 11 is provided at an inner side of each of the lateral dielectric substrates 10. The grounding radiator element 12 is provided at an outer side of the lateral dielectric substrate 10. In the present disclosure, the inner side of the lateral dielectric substrate 10 refers to a side close to and perpendicular to the main dielectric substrate 9, and the outer side refers to the other side of the lateral dielectric substrate 10.

The feeding element 11 is provided at a left side or a right side of the grounding radiator element 12. A plane where the feeding element 11 is located is parallel to a plane where the grounding radiator element 12 is located, and the two elements do not overlap with each other.

There is a positive even number of antenna elements. The antenna elements are symmetrically arranged at two opposite sides of the main dielectric substrate, and symmetrically arranged on the lateral dielectric substrates.

Under a combined action of the feeding element and the grounding radiator element, the present disclosure forms a dual-resonant antenna structure to effectively cover N77, N78, N79 and 5G WLAN band in 5G mobile communication, and achieves desirable antenna efficiency as well as desirable isolation and ECC between the antenna elements. The present disclosure features a simple structure, zero clearance and small height, and can meet design requirements of existing bezel-less mobile terminals.

As a specific embodiment, the main dielectric substrate 9 has dimensions of 150 mm*75 mm*0.8 mm, and the lateral dielectric substrate 10 has dimensions of 150 mm*0.8 mm*7 mm. The main dielectric substrate 9 and the lateral dielectric substrates 10 are all made of an FR4 material.

Figure 3:
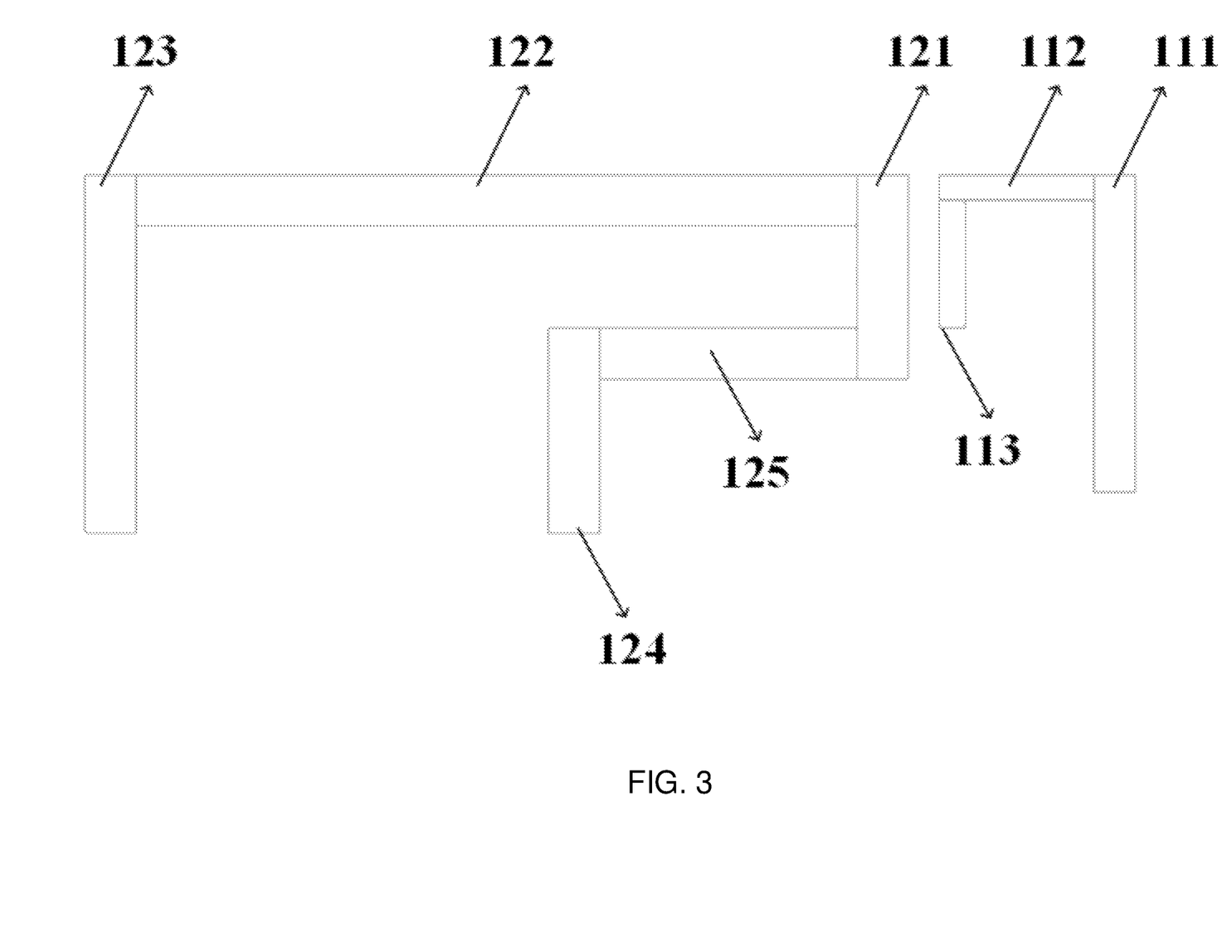
FIG. 3 is a structural view of an antenna element according to an embodiment of the present disclosure.

As shown in FIG. 3, as a specific embodiment, the feeding element 11 includes a first vertical branch 111, a horizontal branch 112, and a second vertical branch 113, which expands a working bandwidth of the antenna element through coupled feeding. The first vertical branch 111 includes a top end connected to one end of the horizontal branch 112, and a bottom end connected to a feeding line (50-ohm microstrip line) on the main dielectric substrate. The second vertical branch 113 includes a top end connected to the other end of the horizontal branch 112, and a bottom end spaced apart from the main dielectric substrate. The present disclosure largely depends on the coupled feeding of the second vertical branch 113 to the grounding radiator element 12, and effectively increases the electrical length of the feeding element, thereby expanding the bandwidth.

The grounding radiator element 12 includes a first vertical radiator 121, a first horizontal radiator 122, a second vertical radiator 123, a third vertical radiator 124, and a second horizontal radiator 125. The first vertical radiator 121 includes a top end connected to one end of the first horizontal radiator 122, and a bottom end connected to one end of the second horizontal radiator 125. A top end of the second vertical radiator 123 is connected to the other end of the first horizontal radiator 122. A top end of the third vertical radiator 124 is connected to the other end of the second horizontal radiator 125. The first vertical radiator 121, the third vertical radiator 124 and the second horizontal radiator 125 are folded, causing reduced dimensions of the antenna in a horizontal direction. Bottom ends of the second vertical radiator 123 and the third vertical radiator 124 are connected to a grounding point on the main dielectric substrate, which can effectively utilize a grounding current, and can increase the electrical length of the antenna without compromising the dimensions of the antenna element, thereby effectively expanding a low-frequency bandwidth of the antenna For instance, the first vertical branch 111 has a length of 5.5-6.5 mm, and a width of 0.5-1.5 mm. The horizontal branch 121 has a length of 2-4 mm, and a width of 0.1-1 mm. The second vertical branch 111 has a length of 1-3 mm, and a width of 0.1-1 mm. The first vertical radiator 121 has a length of 3-5 mm, and a width of 0.1-1.5 mm. The first horizontal radiator 122 has a length of 13-15 mm, and a width of 0.1-1.5 mm. The second vertical radiator 123 has a length of 6-8 mm, and a width of 0.1-1.5 mm. The third vertical radiator 124 has a length of 3-5 mm, and a width of 0.1-1.5 mm. The second horizontal radiator 125 has a length of 4-6 mm, and a width of 0.1-1.5 mm.

Figure 4:
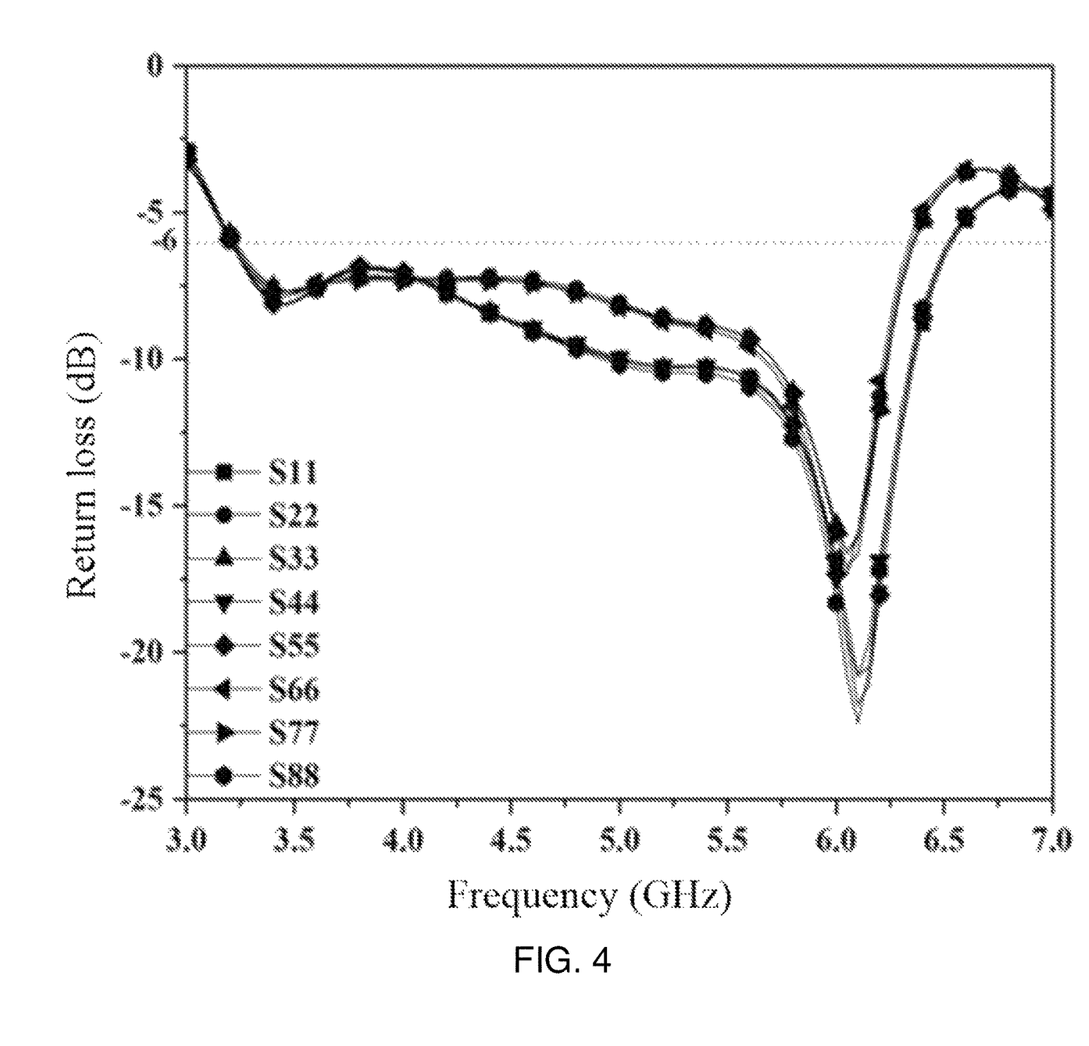
FIG. 4 is a frequency-dependent curve chart of a return loss of a zero-clearance 5G UWB MIMO antenna according to an embodiment of the present disclosure.
Figure 5:
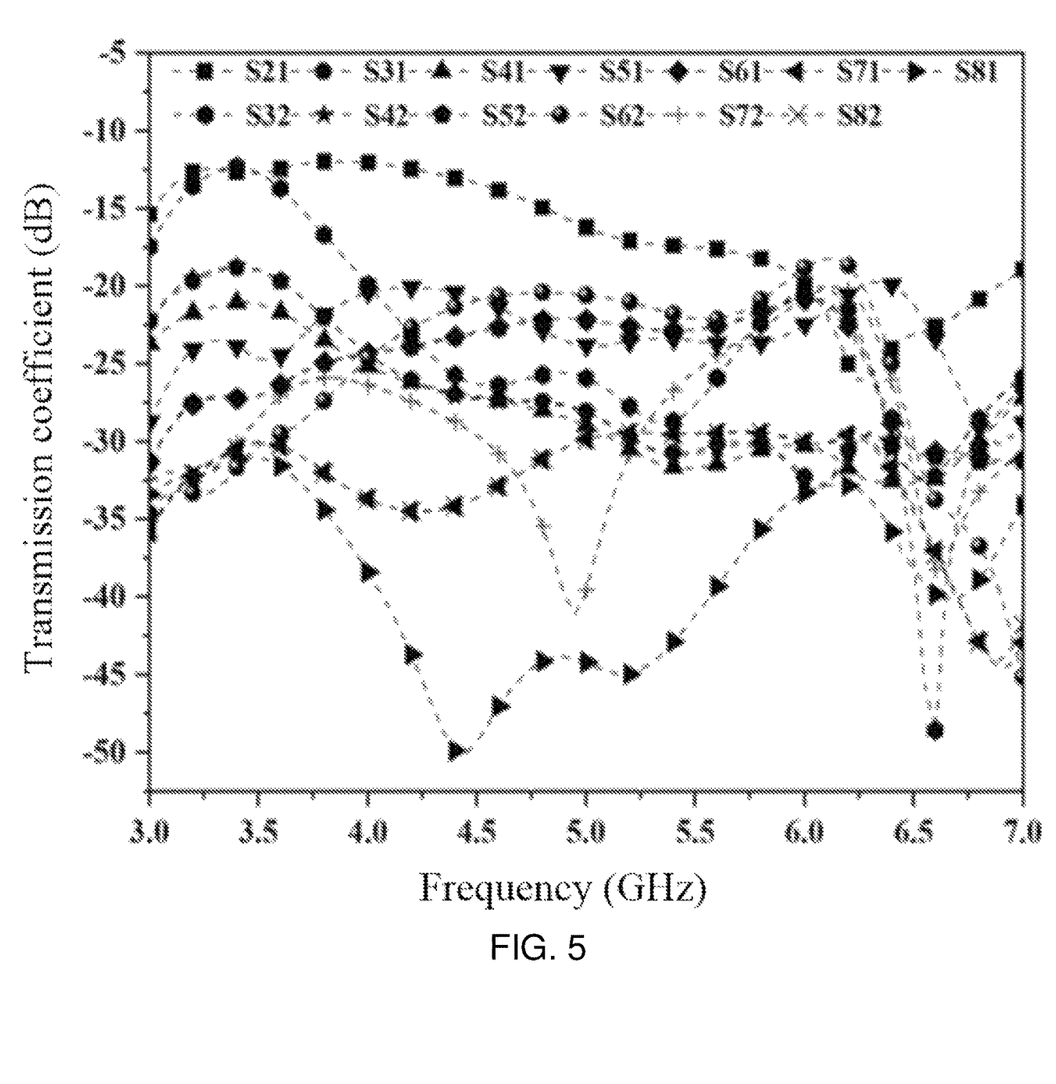
FIG. 5 is a frequency-dependent curve chart of a transmission coefficient of a zero-clearance 5G UWB MIMO antenna according to an embodiment of the present disclosure.

FIG. 4 is a frequency-dependent curve chart of a return loss of a zero-clearance 5G UWB MIMO antenna according to an embodiment of the present disclosure, where the transverse axis refers to the frequency, and the longitudinal axis refers to the return loss. FIG. 5 is a frequency-dependent curve chart of a transmission coefficient of a zero-clearance 5G UWB MIMO antenna according to an embodiment of the present disclosure, where the transverse axis refers to the frequency, and the longitudinal axis refers to the transmission coefficient. As can be seen from S parameters in FIG. 4 and FIG. 5, while the return loss is higher than 6 dB and the isolation between the antenna elements is greater than 10 dB, the UWB MIMO antenna can cover the 3.2-6.4 GHz band. In other words, the antenna elements 1-8 in the present disclosure can cover the N77, N78, N79 and 5G WLAN bands in the 5G mobile communication.

Figure 6:
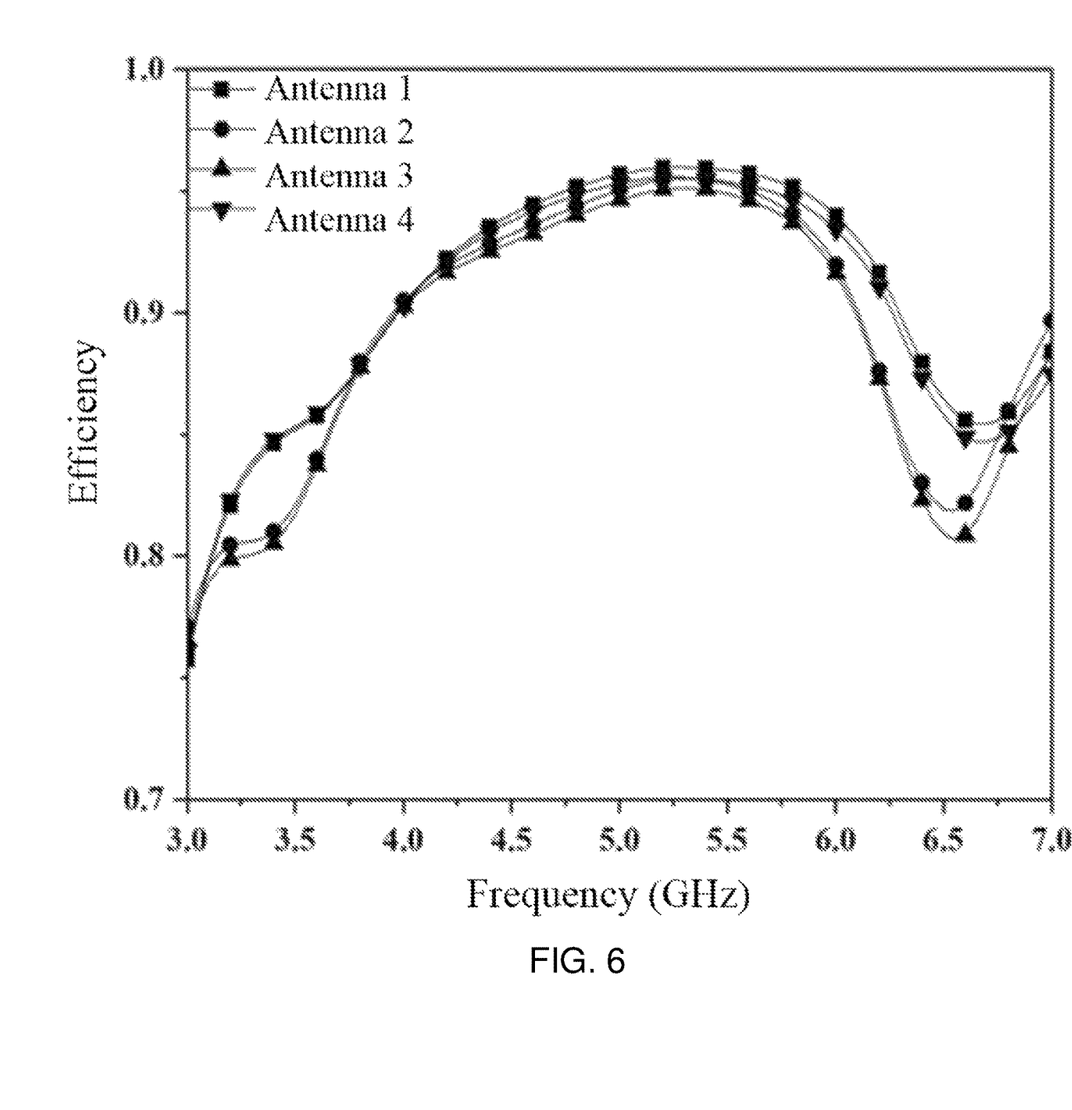
FIG. 6 is a frequency-dependent curve chart of a total efficiency of a zero-clearance 5G UWB MIMO antenna according to an embodiment of the present disclosure.

FIG. 6 is a frequency-dependent curve chart of a total efficiency of a zero-clearance 5G UWB MIMO antenna according to an embodiment of the present disclosure. Within the 3.2-6.4 GHz working band, the total efficiency of the antenna elements 1-8 is greater than the 40% that is desirable for a mobile terminal antenna, and the antenna has desirable radiation performance.

Figure 7:
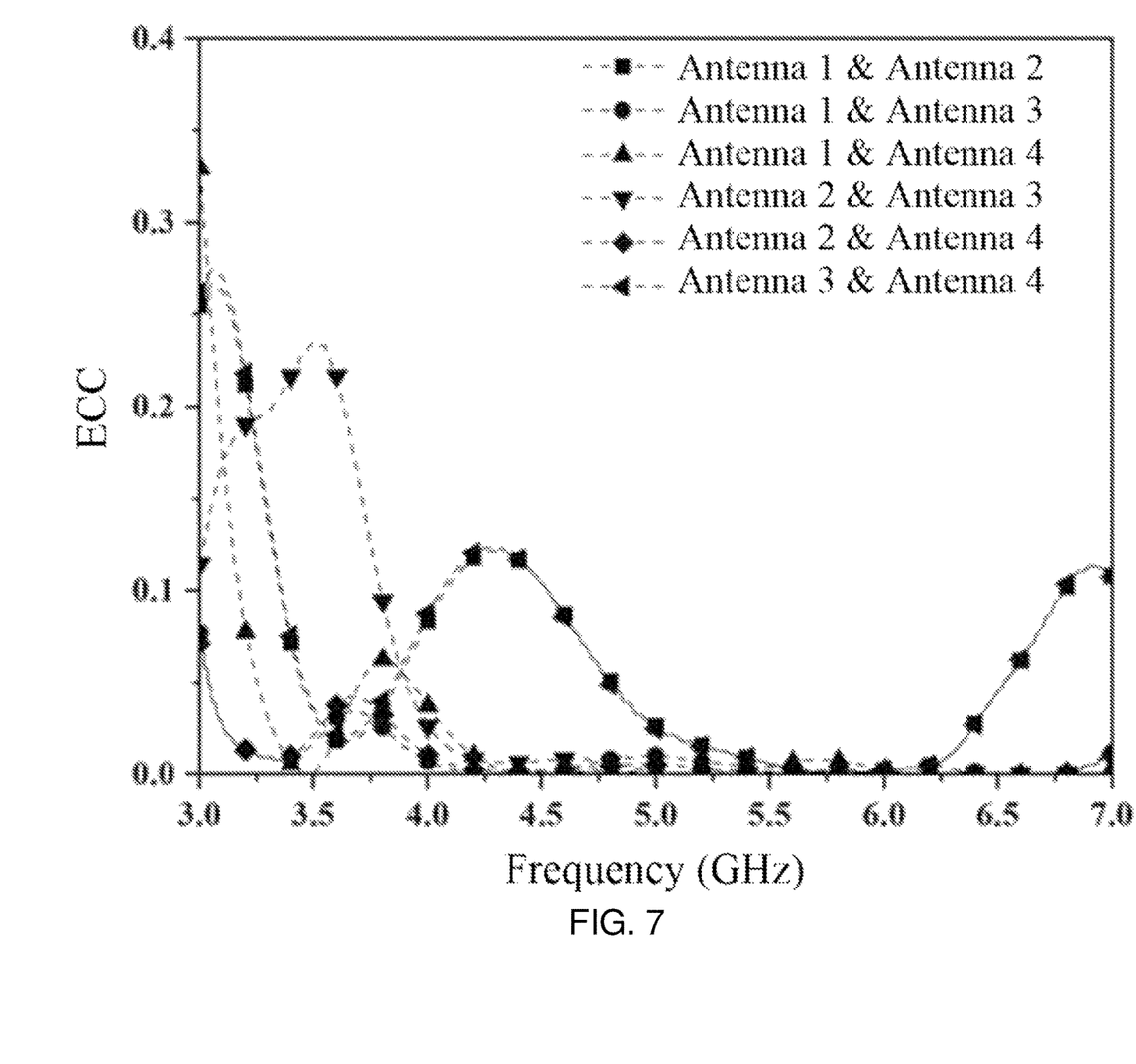
FIG. 7 is a frequency-dependent curve chart of an ECC of a zero-clearance 5G UWB MIMO antenna according to an embodiment of the present disclosure.

FIG. 7 is a frequency-dependent curve chart of an ECC of a zero-clearance 5G UWB MIMO antenna according to an embodiment of the present disclosure. It can be seen that the ECC between the antenna elements of the zero-clearance 5G UWB MIMO antenna is less than 0.3 in terms of the working band, which is less than the 0.5 desired in a mobile terminal device.

Each embodiment of the present specification is described in a progressive manner, each example focuses on the difference from other examples, and the same and similar parts between the examples may refer to each other.

Specific examples are used herein to explain the principles and embodiments of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. As such, the present specification shall not be construed as limiting the present disclosure.

What is claimed is:

1. A zero-clearance fifth-generation (5G) ultra-wideband (UWB) Multiple-Input Multiple-Output (MIMO) antenna, comprising a main dielectric substrate, lateral dielectric substrates, and multiple antenna elements, wherein the lateral dielectric substrates are arranged at two sides of the main dielectric substrate;

the multiple antenna elements are arranged on the lateral dielectric substrates;

each of the multiple antenna elements comprises a feeding element and a grounding radiator element, and wherein, for each of the multiple antenna elements:

the feeding element is provided at an inner side of each of the lateral dielectric substrates; and the grounding radiator element is provided at an outer side of the lateral dielectric substrate;

the feeding element is connected to a feeding line on the main dielectric substrate, and comprises a first vertical branch, a second vertical branch and a horizontal branch;

the first vertical branch comprises a top end connected to one end of the horizontal branch, and a bottom end connected to the feeding line; and the second vertical branch comprises a top end connected to another end of the horizontal branch, and a bottom end spaced apart from the main dielectric substrate.

2. The zero-clearance 5G UWB MIMO antenna of claim 1, wherein spacings between the multiple antenna elements are different.

3. The zero-clearance 5G UWB MIMO antenna of claim 1, wherein the feeding element is an inverted U-shape, and the grounding radiator element is a hollowed-out L-shape.

4. The zero-clearance 5G UWB MIMO antenna of claim 1, wherein, for each of the multiple antenna elements, the grounding radiator element comprises a first vertical radiator, a second vertical radiator, a third vertical radiator, a first horizontal radiator and a second horizontal radiator; the first vertical radiator comprises a top end connected to one end of the first horizontal radiator, and a bottom end connected to one end of the second horizontal radiator; a top end of the second vertical radiator is connected to another end of the first horizontal radiator; a top end of the third vertical radiator is connected to another end of the second horizontal radiator; and a bottom end of the second vertical radiator and a bottom end of the third vertical radiator are connected to a grounding point on the main dielectric substrate.

5. The zero-clearance 5G UWB MIMO antenna of claim 1, wherein the multiple antenna elements comprise a positive even number of antenna elements, and wherein the multiple antenna elements are symmetrically arranged on the lateral dielectric substrates.

6. The zero-clearance 5G UWB MIMO antenna of claim 1, wherein each of the main dielectric substrate and the lateral dielectric substrates is made of an FR4 material.

* * * * *